United States Patent
Sun et al.

(10) Patent No.: US 11,372,090 B2
(45) Date of Patent: Jun. 28, 2022

(54) LIGHT DETECTION AND RANGE (LIDAR) DEVICE WITH SPAD AND APD SENSORS FOR AUTONOMOUS DRIVING VEHICLES

(71) Applicant: Baidu USA LLC, Sunnyvale, CA (US)

(72) Inventors: Tianjia Sun, Sunnyvale, CA (US); Yaoming Shen, Sunnyvale, CA (US); Xiangfei Zhou, Sunnyvale, CA (US); Yang Han, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 781 days.

(21) Appl. No.: 16/215,175

(22) Filed: Dec. 10, 2018

(65) Prior Publication Data

US 2020/0182982 A1 Jun. 11, 2020

(51) Int. Cl.
*G01S 7/4863* (2020.01)
*G01S 7/484* (2006.01)
(Continued)

(52) U.S. Cl.
CPC ............ *G01S 7/4863* (2013.01); *G01S 7/484* (2013.01); *G01S 7/4865* (2013.01); *G01S 17/931* (2020.01)

(58) Field of Classification Search
CPC ...... G01S 17/931; G01S 7/484; G01S 7/4863; G01S 7/4865; G01S 17/10; G01S 17/894; G01S 7/497; G01S 17/42; G01S 17/89; G01S 7/4816; G01S 7/4868; G01S 7/487; G01S 17/08; G01S 17/18; G01S 17/48; G01S 7/4802; G01S 7/489; G01J 1/44; G01J 2001/4466; G01J 2001/4406; G01J 2001/442; G01J 2001/448; H01L 27/14643; H01L 31/02027; H01L 31/107;
(Continued)

(56) References Cited

U.S. PATENT DOCUMENTS 6,310,682 B1* 10/2001 Gavish .................. G01S 7/4865
342/134
11,079,478 B2* 8/2021 Perenzoni ............... G01S 17/10
(Continued)

*Primary Examiner* — Yuqing Xiao
*Assistant Examiner* — Amir J Askarian
(74) *Attorney, Agent, or Firm* — Womble Bond Dickinson (US) LLP

(57) ABSTRACT

In one embodiment, a LIDAR device of an autonomous driving vehicle (ADV) includes a light emitter to emit a light beam towards a target, wherein at least a portion of the light beam is reflected from the target. The LIDAR device further includes an optical sensing unit including a first photodetector and a second photodetector. The first photodetector is a different type of photodetector from the second photodetector, where the optical sensing unit is to receive the portion of the light beam reflected from the target. When the optical sensing unit receives the portion of the light beam, the first photodetector generates a first optical sensor output signal and the second photodetector generates a second optical sensor output signal. The LIDAR device further includes a first circuitry portion to generate an intensity signal indicative of an intensity of the received portion of the light beam responsive to the first optical sensor output signal. The LIDAR device further includes a second circuitry portion to generate a time of flight (ToF) signal indicative of a ToF of the emitted light beam responsive to the second optical sensor output signal.

23 Claims, 11 Drawing Sheets

(51) Int. Cl.
   *G01S 7/4865*    (2020.01)
   *G01S 17/931*    (2020.01)
(58) Field of Classification Search
   CPC ............... H01L 27/146; H01L 27/1461; H01L 27/14612; H01L 27/1464
   See application file for complete search history.

(56) References Cited

U.S. PATENT DOCUMENTS

| | | | |
|---|---|---|---|
| 2016/0054447 A1* | 2/2016 | Sun ...................... | G01S 17/894 356/5.01 |
| 2016/0240579 A1* | 8/2016 | Sun ...................... | G01S 7/4914 |
| 2017/0090019 A1* | 3/2017 | Slobodyanyuk ...... | G01S 7/4865 |
| 2018/0172834 A1* | 6/2018 | Kolb ...................... | G01S 17/42 |
| 2018/0210084 A1* | 7/2018 | Zwolfer .................. | G01S 17/14 |
| 2018/0284229 A1* | 10/2018 | Liu ...................... | G01S 7/4865 |
| 2018/0306926 A1* | 10/2018 | LaChapelle ......... | H01L 31/1085 |
| 2019/0079166 A1* | 3/2019 | Kim ...................... | G01S 17/931 |
| 2019/0219674 A1* | 7/2019 | Tokmak .................. | G01S 17/10 |
| 2020/0057146 A1* | 2/2020 | Steinkogler et al. . | G01S 7/4816 |
| 2020/0256964 A1* | 8/2020 | Campbell ............. | G01S 7/4865 |
| 2020/0389606 A1* | 12/2020 | Petilli .................. | G01S 7/4816 |
| 2021/0126025 A1* | 4/2021 | Kennedy ............ | H04N 5/37455 |
| 2021/0156976 A1* | 5/2021 | Beer .................... | G01S 7/4865 |

* cited by examiner

LIGHT DETECTION AND RANGE (LIDAR) DEVICE WITH SPAD AND APD SENSORS FOR AUTONOMOUS DRIVING VEHICLES

TECHNICAL FIELD

Embodiments of the present disclosure relate generally to operating autonomous driving vehicles. More particularly, embodiments of the disclosure relate to a LIDAR device utilized in autonomous driving vehicles.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

LIDAR techniques have been widely utilized in military, geography, oceanography, and in the latest decade, autonomous driving vehicles. Apart from others, LIDAR's applications in autonomous driving vehicles have been hindered by the high cost. A LIDAR device can estimate a distance to an object while scanning through a scene to assemble a point cloud representing a reflective surface of the object. Individual points in the point cloud can be determined by transmitting a laser pulse and detecting a returning pulse, if any, reflected from the object, and determining the distance to the object according to the time delay between the transmitted pulse and the reception of the reflected pulse. A laser or lasers can be rapidly and repeatedly scanned across a scene to provide continuous real-time information on distances to reflective objects in the scene.

A traditional LIDAR device typically utilizes either single-photon avalanche diode (SPAD) sensors or avalanche photodiode (APD) sensors. A SPAD sensor is typically desirable for detecting the timing of received light reflected from a target. However, the SPAD sensor cannot adequately indicate the strength or intensity of the received light. On the other hand, an APD sensor is desirable for detecting the intensity of the received light, but is inadequate for detecting the timing of the received light. In order for an APD-based LIDAR device to detect such timing, an expensive high speed analog-to-digital converter (ADC) must be utilized. Typical readout circuits for SPAD-based and APD-based LIDAR devices are illustrated in FIGS. 5A and 5B, respectively.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
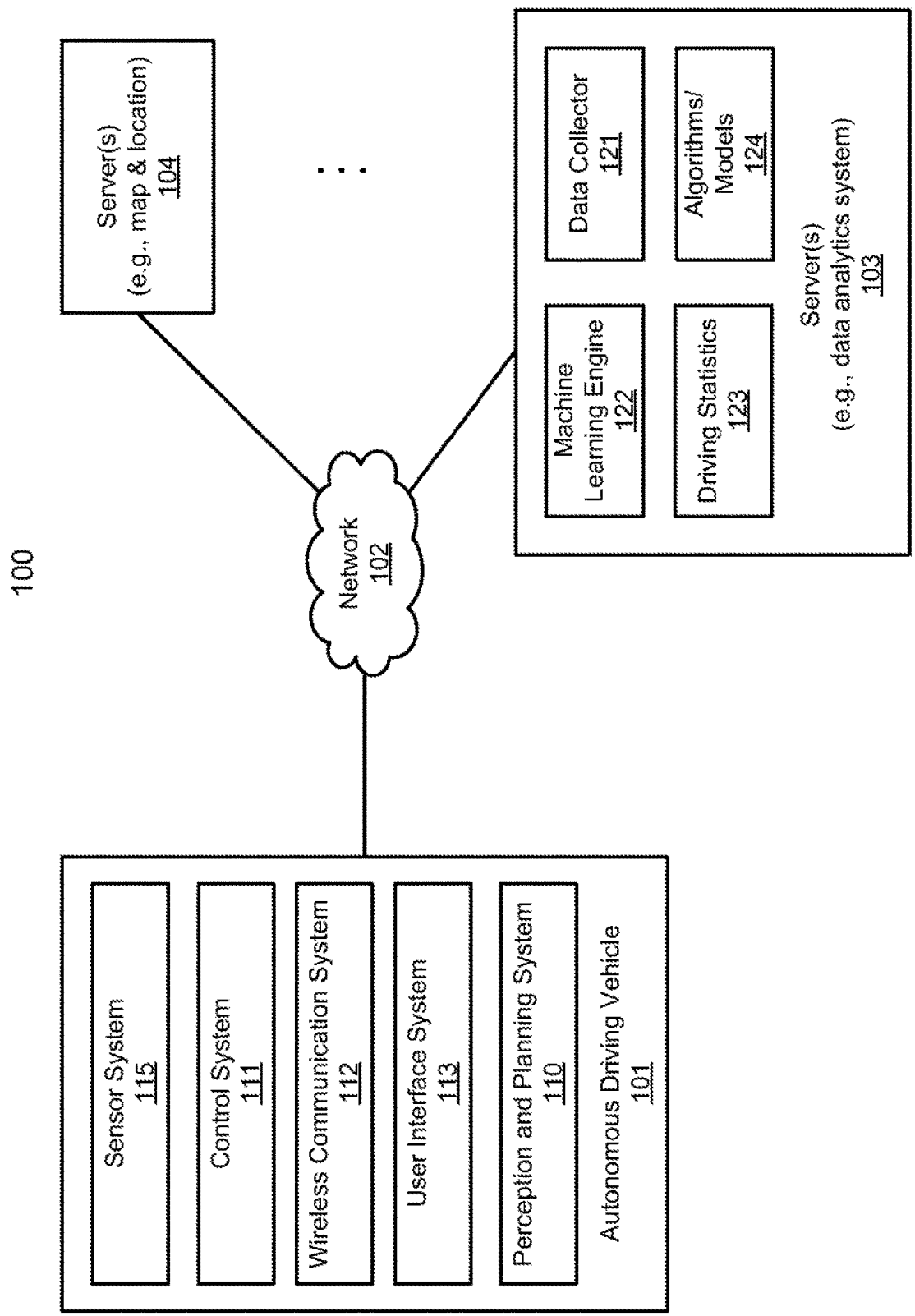
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to one aspect, a LIDAR device of an autonomous driving vehicle (ADV) includes a light emitter to emit a light beam towards a target, wherein at least a portion of the light beam is reflected from the target. The LIDAR device further includes an optical sensing unit including a first photodetector and a second photodetector. The first photodetector is a different type of photodetector from the second photodetector, where the optical sensing unit is to receive the portion of the light beam reflected from the target. When the optical sensing unit receives the portion of the light beam, the first photodetector generates a first optical sensor output signal and the second photodetector generates a second optical sensor output signal. The LIDAR device further includes a first circuitry portion to generate an intensity signal indicative of an intensity of the received portion of the light beam responsive to the first optical sensor output signal. The LIDAR device further includes a second circuitry portion to generate a time of flight (ToF) signal indicative of a ToF of the emitted light beam responsive to the second optical sensor output signal.

According to another aspect, an autonomous driving vehicle is disclosed. The autonomous driving vehicle includes a LIDAR device. The LIDAR device includes a light emitter to emit a light beam towards a target, wherein at least a portion of the light beam is reflected from the target. The LIDAR device further includes an optical sensing unit including a first photodetector and a second photodetector. The first photodetector is a different type of photodetector from the second photodetector, where the optical sensing unit is to receive the portion of the light beam reflected from the target. When the optical sensing unit receives the portion of the light beam, the first photodetector generates a first optical sensor output signal and the second photodetector generates a second optical sensor output signal. The LIDAR device further includes a first circuitry portion to generate an intensity signal indicative of an intensity of the received portion of the light beam responsive to the first optical sensor output signal. The LIDAR device further includes a second circuitry portion to generate a ToF signal indicative of a ToF of the emitted light beam responsive to the second optical sensor output signal.

According to yet another aspect, a method for operating a LIDAR device of an autonomous driving vehicle is disclosed. Using a light emitter, a light beam is emitted to sense a physical range of a target. Using an optical sensing unit, at least a portion of the light beam reflected from the target is received. A first optical sensor output signal and a second optical sensor output signal are generated by the optical sensing unit responsive to the received portion of the light beam. An intensity signal indicative of an intensity of the received portion of the light beam is produced based on the first optical sensor output signal. A ToF signal indicative of a ToF of the emitted light beam is produced based on the second optical sensor output signal.

In one embodiment, the first photodetector is an avalanche photodiode (APD) and the second photodetector is a single-photon avalanche diode (SPAD). In one embodiment, the second circuitry portion includes a time to digital converter (TDC) to generate the ToF signal based on the second optical sensor output signal and a light emitter trigger signal. In one embodiment, the first circuitry portion includes an integrator to perform integration on the first optical sensor output signal, based on the ToF signal and an activation signal, to produce an integrator output signal, an analog to digital converter (ADC) to sample the integrator output signal at a sampling rate to produce the intensity signal. In one embodiment, the LIDAR device further includes a logic block to generate the light emitter trigger signal that triggers the light emitter to emit the light beam, and the activation signal that activates the integrator.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
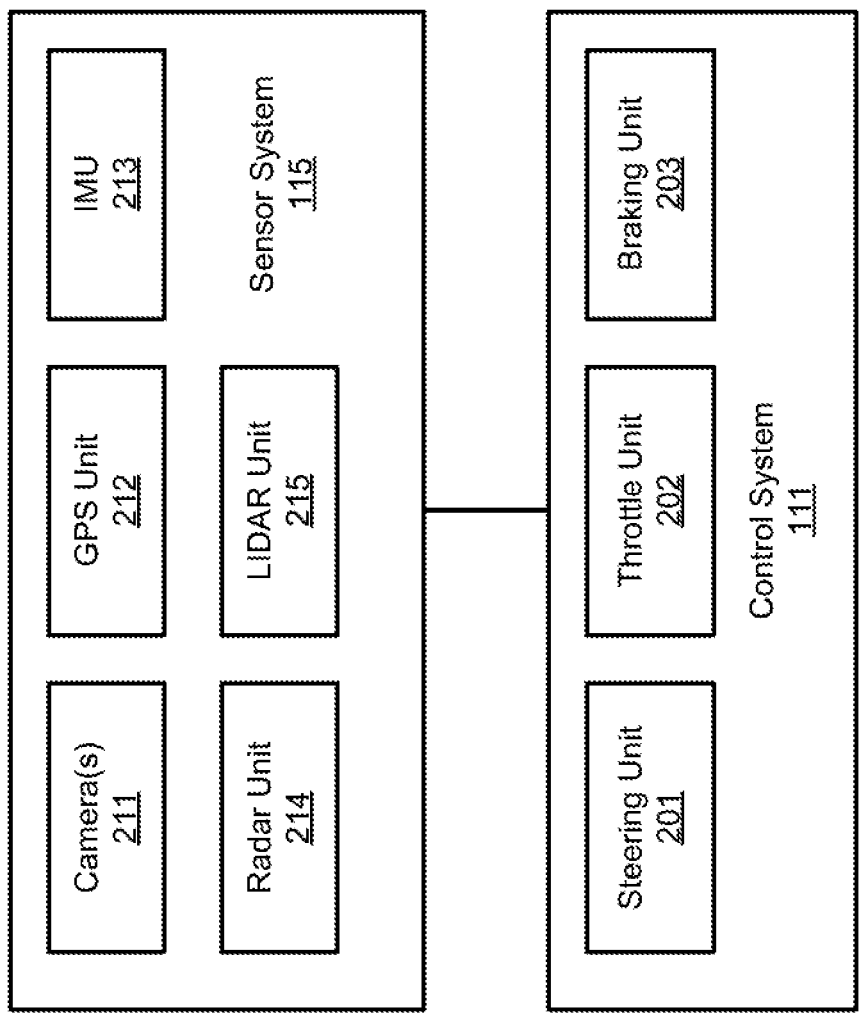
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle.

Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include an algorithm to process LIDAR sensor data for perception using a LIDAR device described throughout this application. Algorithms 124 can then be uploaded on ADVs to be utilized during autonomous driving in real-time.

Figure 3:
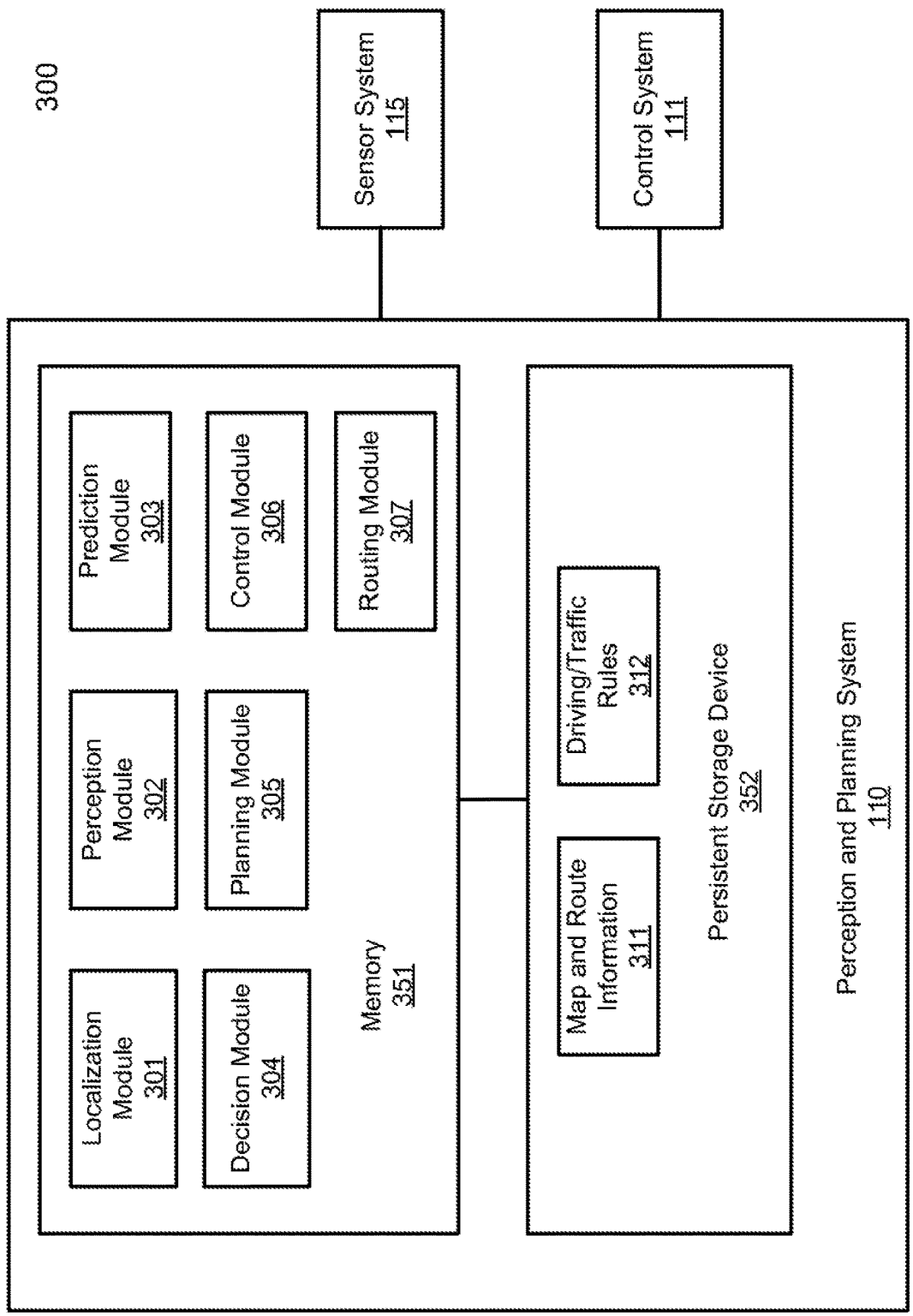
FIG. 3 is a block diagram illustrating an example of a perception and planning system used with an autonomous vehicle according to one embodiment.

FIG. 3 is a block diagram illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIG. 3, perception and planning system 110 includes, but is not limited to, localization module 301, perception module 302, prediction module 303, decision module 304, planning module 305, control module 306, and routing module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Figure 4:
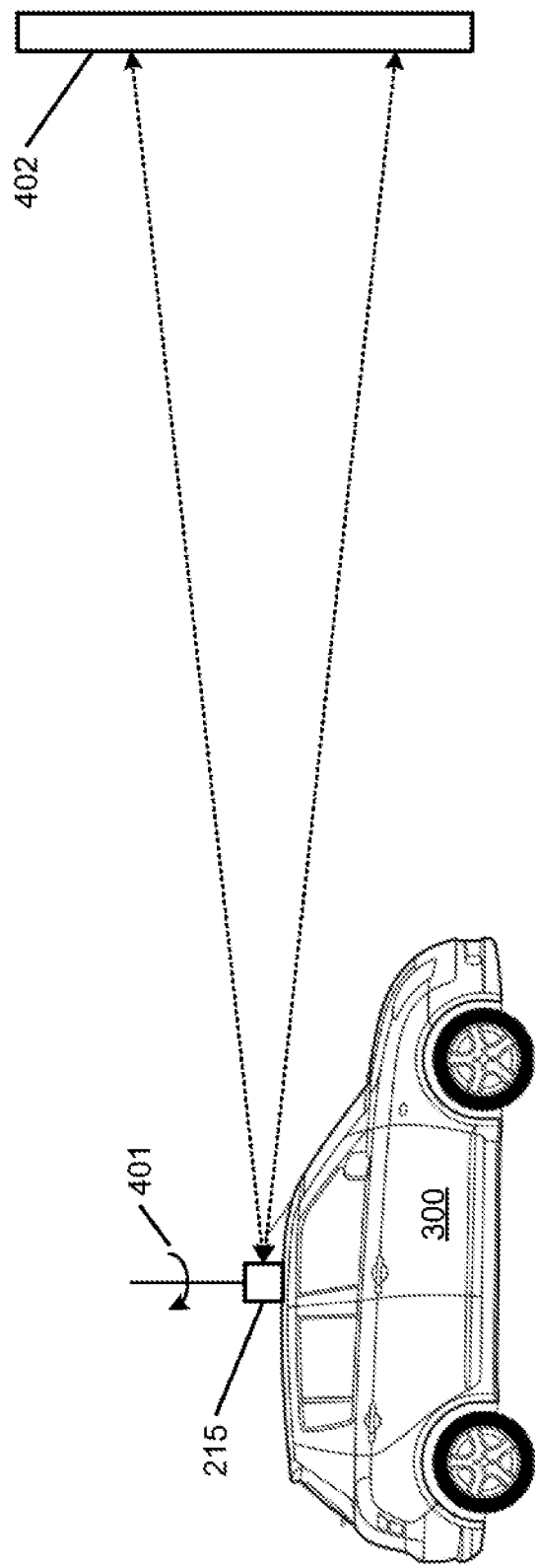
FIG. 4 shows a typical LIDAR mounting configuration.
Figure 5A:
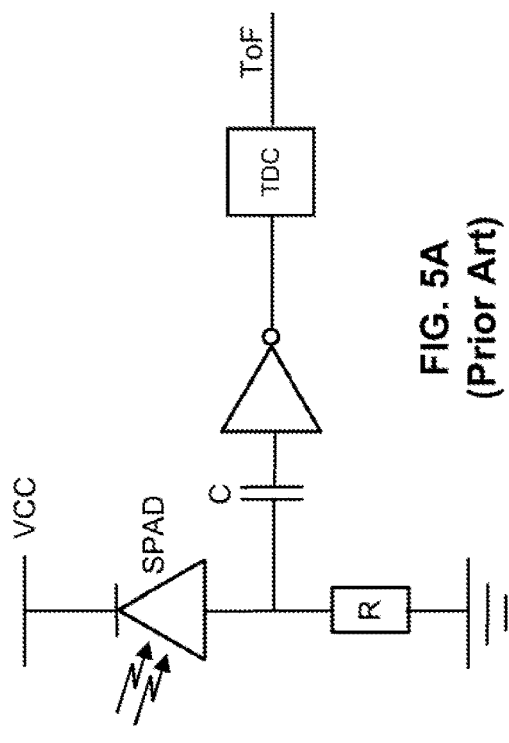
FIGS. 5A-5B are circuit diagrams illustrating conventional readout circuits for SPAD-based and APD-based LIDAR devices, respectively.
Figure 5B:
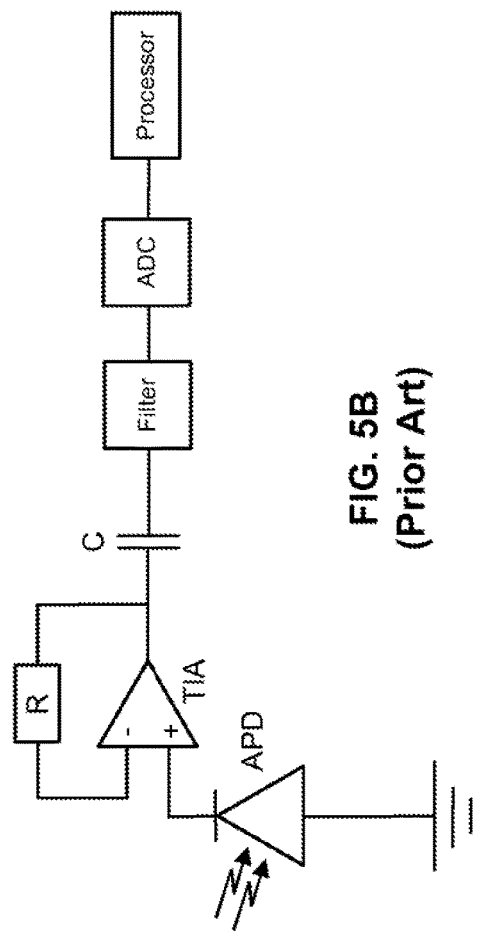

FIG. 4 shows a typical LIDAR configuration with respect to an autonomous driving vehicle. As shown in FIG. 4, LIDAR device 215 is typically mounted on the top of ADV 300. The LIDAR device is configured to spin horizontally and vertically, for example, according to spinning direction 401, such that LIDAR device 215 can scan the entire 360 degree environment. LIDAR device 215 includes at least one light emitter therein (not shown) to emit a light beam towards target 402. LIDAR device 215 further includes at least one light detector or light sensor (not shown) to receive and detect the light beam reflected from target 402.

Figure 6A:
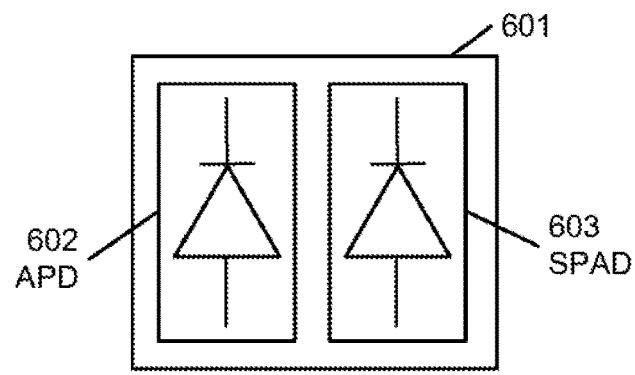
FIGS. 6A-6C are diagrams illustrating embodiments of a LIDAR optical sensing unit according to the present disclosure.
Figure 6B:
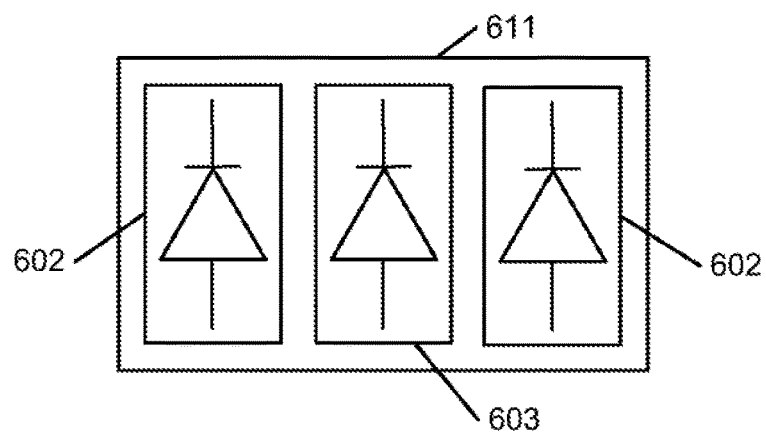
Figure 6C:
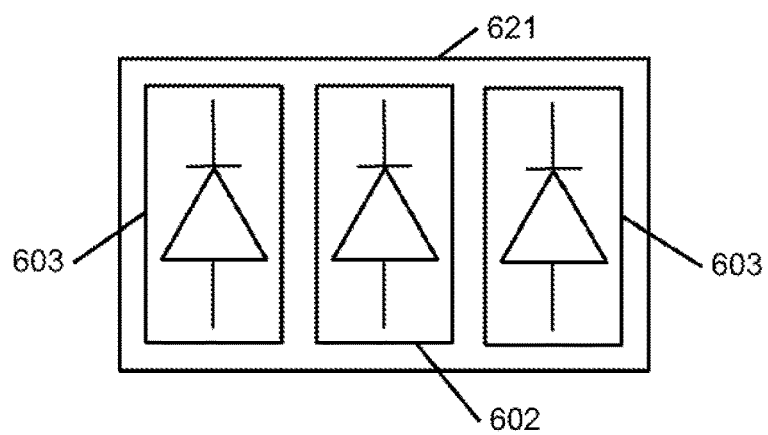

FIGS. 6A-6C are diagrams illustrating embodiments of a LIDAR optical sensor according to the present disclosure. Referring to FIG. 6A, in one embodiment, LIDAR optical sensor 601 (also referred to as optical sensing unit) may include a first photodetector 602 (e.g., an avalanche photodiode (APD)) and a second photodetector 603 (e.g., a single-photon avalanche diode (SPAD)). First photodetector 602 and second photodetector 603 are configured to sense light beam reflected from a target (e.g., target 402) and generate a photodetector output signal. In one embodiment, first photodetector 602 and second photodetector 603 may be configured side-by-side (as shown) to form a photodetector pair.

Referring to FIG. 6B, in another embodiment, LIDAR optical sensing unit 611 may include a photodetector 603 and two photodetectors 602, with the photodetector 603 being disposed between the two photodetectors 602. In yet another embodiment, referring to FIG. 6C, optical sensing unit 621 may include a photodetector 602 and two photodetectors 603, with photodetector 602 being disposed between the two photodetectors 603. It should be noted that the embodiments of FIGS. 6A-6C are not limiting. Thus, a LIDAR optical sensing unit may include any number of first and second photodetectors, with the photodetectors being arranged in any configuration.

Figure 7:
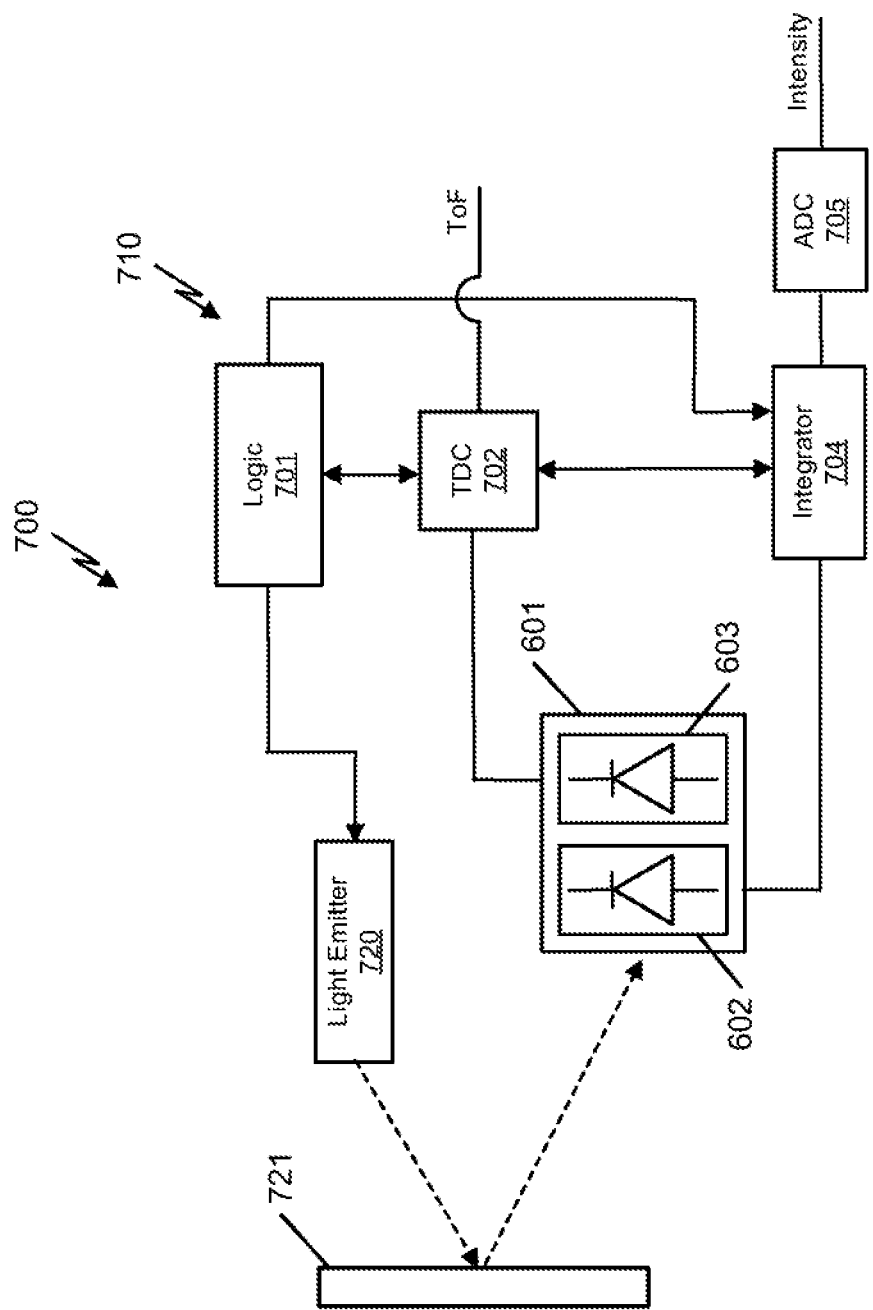
FIG. 7 is a block diagram illustrating a LIDAR device according to one embodiment.

FIG. 7 is a block diagram illustrating a LIDAR device according to one embodiment. Referring to FIG. 7, LIDAR device 700 may include a readout circuit 710 and light emitter 720. Light emitter 720 for example may include pulsed laser sources such as laser diodes. Readout circuit 710 includes optical sensing unit 601 (as previously described), logic block 701, time to digital converter (TDC) 702, integrator 704, and analog to digital converter (ADC) 705.

Logic block 701 controls the triggering of light emitter 702, the start time of TDC 702, and the activation of integrator 704. TDC 702 provides a time interval or time of flight (ToF) between the time logic block 701 triggers the light emitter 702 and the time optical sensing unit 601 detects a reflected light beam from target 721. Integrator 704 performs the mathematical operation of integration with respect to time such that its output signal is proportional to its input signal integrated over time. ADC 705 converts an analog signal into digital form by sampling its input signal by a sampling rate (e.g., 100 kHz~1 MHz). This sampling rate is low as compared to the ADC used in conventional readout circuits, which is generally 1 GHz~3 GHz.

In operation, logic block 701 may send a light emitter trigger signal to light emitter 720. Concurrently, logic block 701 may also send the light emitter trigger signal (which can be seen as a start signal) to TDC 702. In response to the trigger signal, light emitter 720 emits a light beam towards target 721, where a portion (or all) of the light beam is reflected from target 721. Optical sensing unit 601 may detect the reflected light beam and provide optical sensor output signals to TDC 702 and integrator 704. More specifically, in response to detecting the reflected light beam, photodetector 602 (e.g., an ADP) may generate and provide a first optical sensor output signal to integrator 704. Based on the first optical sensor output signal, a ToF signal (provided by TDC 702), and an activation signal from logic 701, integrator 704 may integrate the first optical sensor output signal over a time period (e.g., as provided by the ToF signal) to produce an integrator output signal. The integrator output signal may then be converted to digital form by ADC 705 to generate an intensity signal indicative of the intensity of the received portion of the light beam.

Correspondingly, in response to detecting the reflected light beam, photodetector 603 (e.g., an SPAD) may generate and provide a second optical sensor output signal to TDC 702. TDC 702 can be seen to function similar to a stopwatch. Thus, as the light emitter trigger signal can be seen as a start signal, the second optical sensor output signal can be seen as a stop signal. Based on these two signals, TDC may generate a ToF signal indicative of the ToF of the emitted light beam. Subsequently, the ToF can be utilized to compute a distance (or physical range) between LIDAR device 700 and target 721. Although not shown in FIG. 7, in some embodiments, the first optical sensor output signal may be amplified by a transimpedance amplifier (TIA) prior to being integrated by integrator 704. In some embodiments, the second optical sensor output signal may be provided to a capacitor (not shown) for charging and subsequently inverting by an inverter (also not shown) prior to providing it to the TDC 702.

Figure 8:
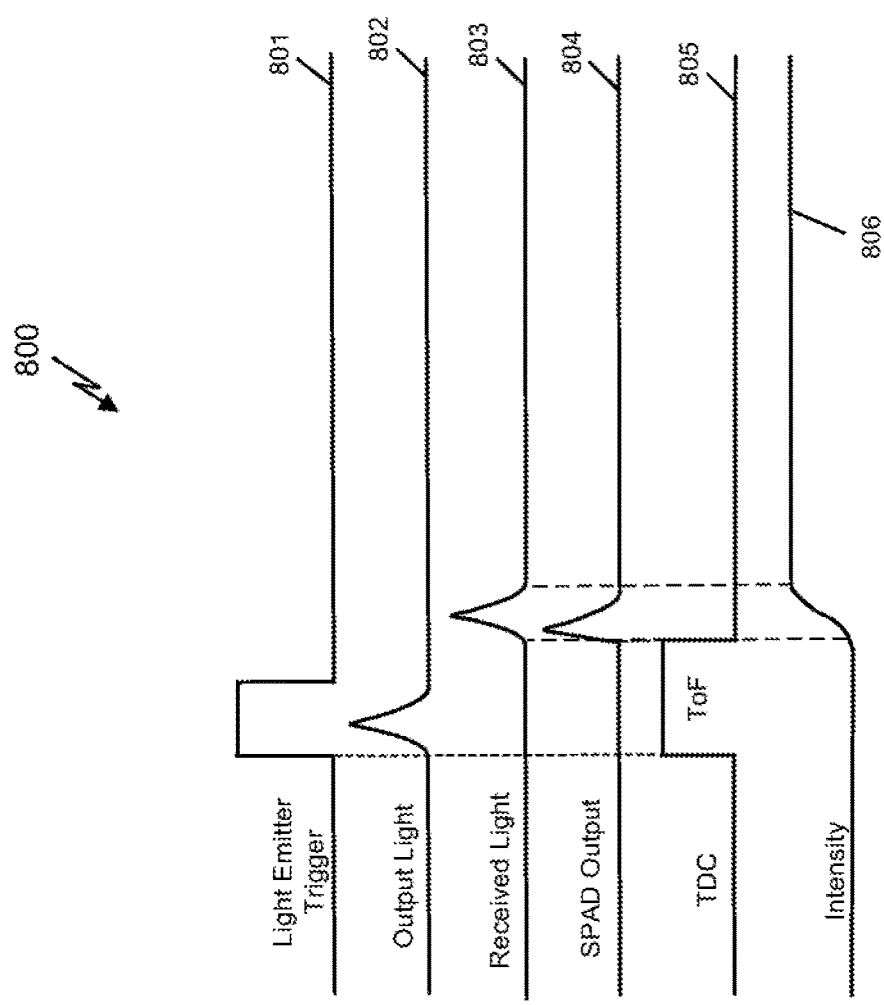
FIG. 8 diagrammatically illustrates relationships among different signals according to one embodiment.

FIG. 8 diagrammatically illustrates relationships among different signals according to one embodiment. As shown, light emitter trigger signal 801 is represented by a square waveform, where a "high" state may correspond to the triggering of light emitter 720. Emitted or output light beam 802, received reflected light beam 803, and SPAD output signal 804 (i.e., second optical sensor output signal, as previously described) are transient in nature. TDC or ToF signal 805 is also represented by a square waveform, where the duration of the "high" state (i.e., ToF) of the signal 805 is determined by the rising edges of signal 801 (i.e., start signal) and signal 804 (i.e., stop signal). Intensity signal 806, as previously described, indicates the intensity of the received reflected light beam 803. Thus, the higher the amplitude of signal 806, the higher the intensity, and vice versa (i.e., directly proportional). As shown, intensity signal 806 gradually changes from a "low" state to a high "state" when received reflected light beam 803 also goes from a "low" state to "high" state. That is, integration (e.g., by integrator 704) begins when a reflected light beam is received or detected by optical sensing unit 601 (i.e., photodetector 602).

Figure 9A:
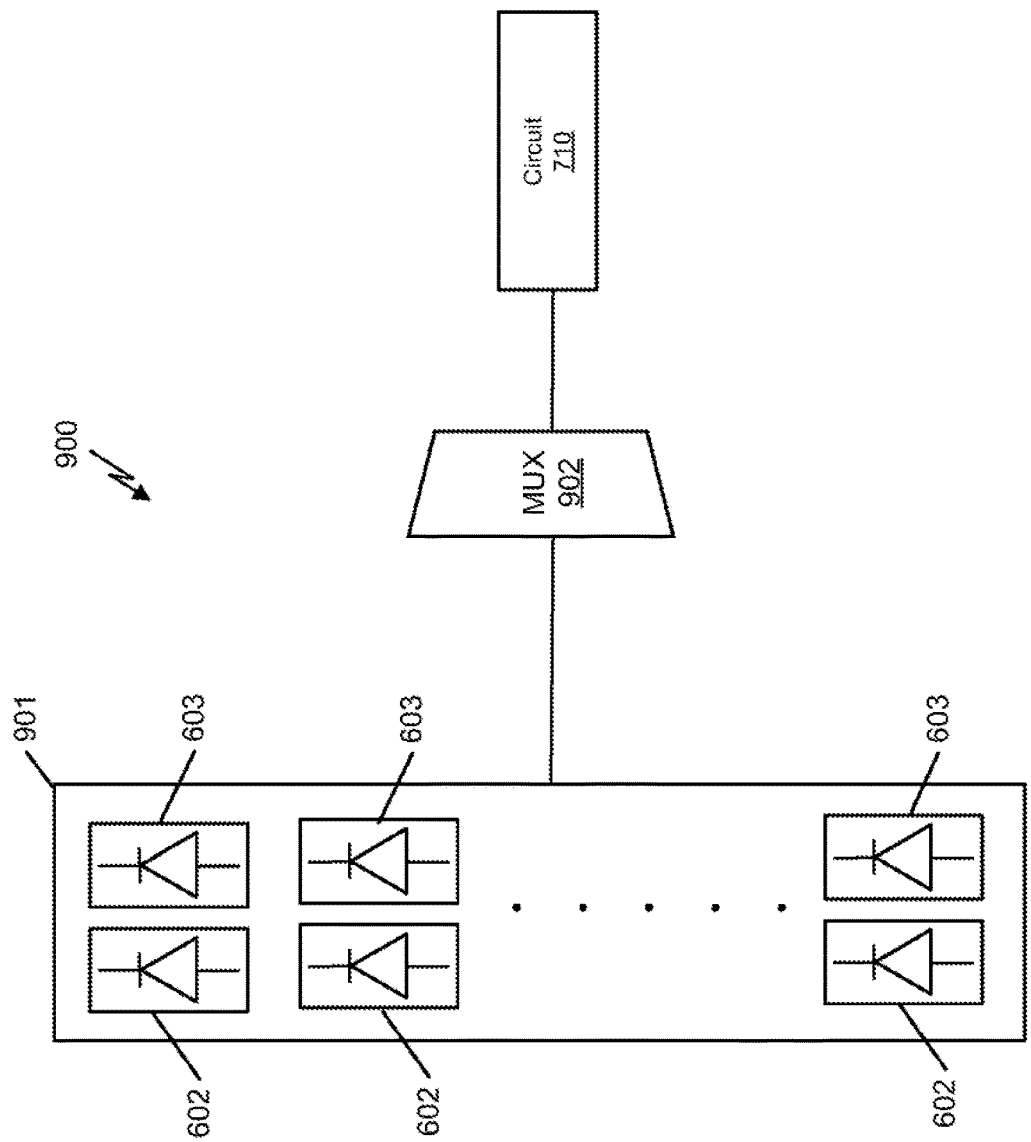
FIG. 9A is a block diagram illustrating a LIDAR device according to another embodiment.

FIG. 9A is a block diagram illustrating a LIDAR device according to another embodiment. In FIG. 9A, LIDAR device 900 may include optical sensing unit 901, a selector (or multiplexer) 902 and readout circuit 710 (as previously described). Optical sensing unit 901 may include a number of photodetector pairs (i.e., photodetectors 602-603 pairs). Each photodetector pair may provide first and second optical sensor output signals (as previously described). The signals may be selected by selector 902 and communicated to circuit 710 for processing. The operations of circuit 710 have been previously described, and for brevity sake, are not described again herein. In some embodiments, the number of photodetector pairs may be 16×4 for a total of 64 pairs, although any number of photodetector pairs may be implemented. Each photodetector pair may correspond to a pixel in a LIDAR-derived image.

Figure 9B:
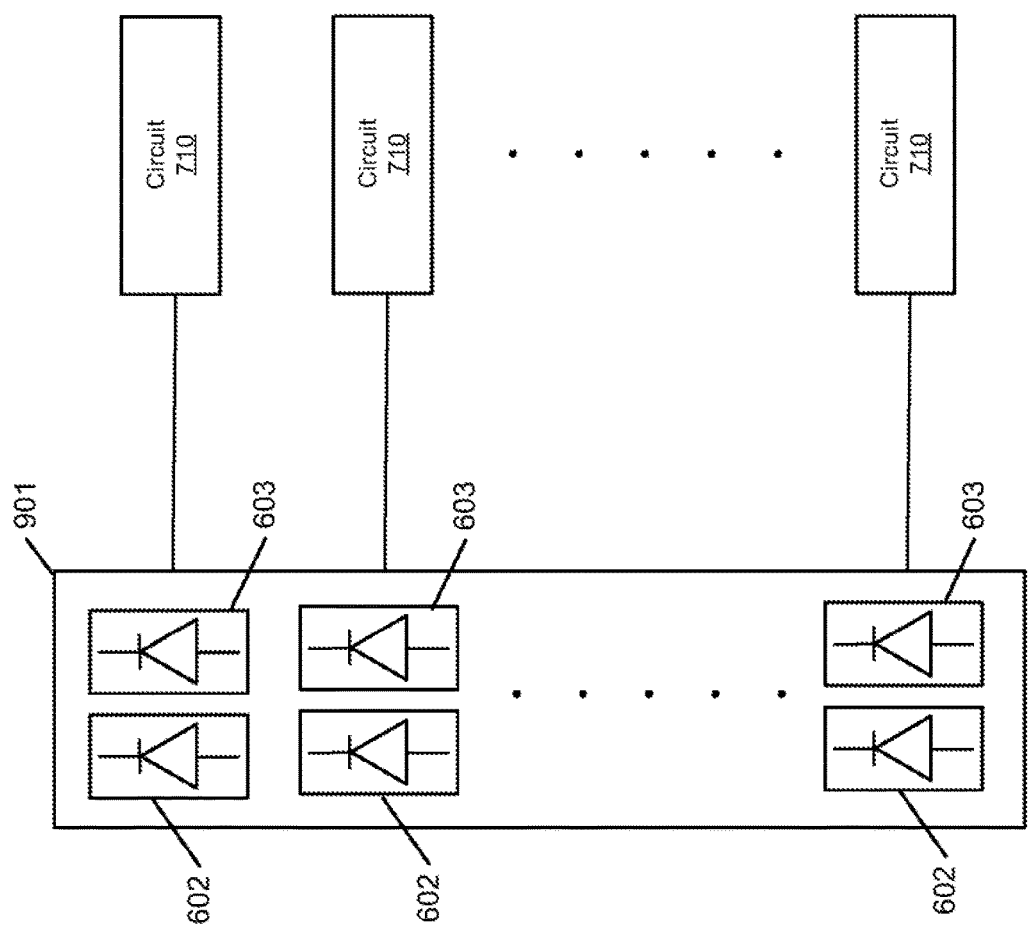
FIG. 9B is a block diagram illustrating a LIDAR device according to yet another embodiment.

Alternatively, in some embodiments the selector 902 may not be necessarily. For example, referring to FIG. 9B, LIDAR device 900 may include optical sensing unit 901 and a number of circuits 710. In this embodiment, the number of circuits 710 would be equivalent to the number of photodetector pairs, where each circuit 710 processes the first and second optical sensor output signals from its corresponding photodetector pair.

Figure 10:
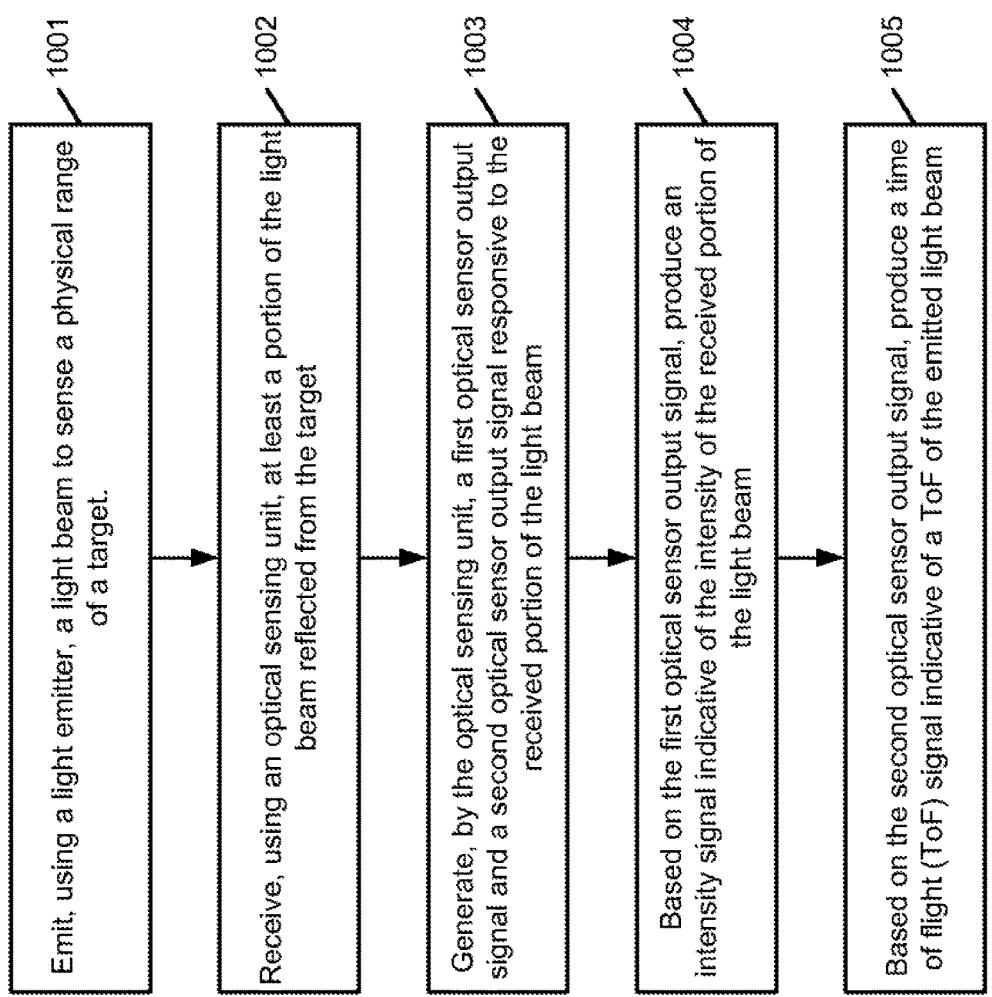
FIG. 10 is a flow diagram illustrating a process of operating a LIDAR device according to one embodiment.

FIG. 10 is a flow diagram illustrating a process of operating a LIDAR device according to one embodiment. Process 1000 may be performed by a LIDAR device which may include software, hardware, or a combination thereof. Referring to FIG. 10, in operation 1001, the process emits, using a light emitter, a light beam to sense a physical range of a target. In operation 1002, the process receives, using an optical sensing unit, at least a portion of the light beam reflected from the target. In operation 1003, the process generates, by the optical sensing unit, a first optical sensor output signal and a second optical sensor output signal responsive to the received portion of the light beam. In operation 1004, based on the first optical sensor output signal, the process produces an intensity signal indicative of the intensity of the received portion of the light beam. In operation 1005, based on the second optical sensor output signal, the process produces a ToF signal indicative of a ToF of the emitted light beam.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A light detection and range (LIDAR) device utilized in an autonomous driving vehicle, comprising:
   a light emitter to emit a light beam towards a target, wherein at least a portion of the light beam is reflected from the target;
   an optical sensing unit including a first photodetector and a second photodetector, the first photodetector being a different type of photodetector from the second photodetector, wherein the optical sensing unit is to receive the portion of the light beam reflected from the target, wherein when the optical sensing unit receives the portion of the light beam, the first photodetector generates a first optical sensor output signal and the second photodetector generates a second optical sensor output signal;
   a first circuitry portion to generate an intensity signal indicative of an intensity of the received portion of the light beam responsive to the first optical sensor output signal; and
   a second circuitry portion to generate a time of flight (ToF) signal indicative of a ToF of the emitted light beam responsive to the second optical sensor output signal;
   wherein the first circuitry portion comprises an integrator to perform integration on the first optical sensor output signal, based on the ToF signal and an activation signal that activates the integrator, to produce an integrator output signal.

2. The LIDAR device of claim 1, wherein the first photodetector is an avalanche photodiode (APD) and the second photodetector is a single-photon avalanche diode (SPAD).

3. The LIDAR device of claim 1, wherein the second circuitry portion comprises:

a time to digital converter (TDC) to generate the ToF signal based on the second optical sensor output signal and a light emitter trigger signal.

4. The LIDAR device of claim 3, wherein the first circuitry portion further comprises:
an analog to digital converter (ADC) to sample the integrator output signal at a sampling rate to produce the intensity signal.

5. The LIDAR device of claim 4, further comprising a logic block to generate the light emitter trigger signal that triggers the light emitter to emit the light beam, and the activation signal that activates the integrator.

6. The LIDAR device of claim 4, wherein an amplitude of the intensity signal is directly proportional to the intensity of the received portion of the light beam.

7. The LIDAR device of claim 1, wherein a distance between the LIDAR device and the target is determined based on the ToF of the emitted light beam.

8. An autonomous driving vehicle, comprising:
a light detection and range (LIDAR) device, wherein the LIDAR device comprises
a light emitter to emit a light beam towards a target, wherein at least a portion of the light beam is reflected from the target;
an optical sensing unit including a first photodetector and a second photodetector, the first photodetector being a different type of photodetector from the second photodetector, wherein the optical sensing unit is to receive the portion of the light beam reflected from the target, wherein when the optical sensing unit receives the portion of the light beam, the first photodetector generates a first optical sensor output signal and the second photodetector generates a second optical sensor output signal;
a first circuitry portion to generate an intensity signal indicative of an intensity of the received portion of the light beam responsive to the first optical sensor output signal; and
a second circuitry portion to generate a time of flight (ToF) signal indicative of a ToF of the emitted light beam responsive to the second optical sensor output signal;
wherein the first circuitry portion comprises an integrator to perform integration on the first optical sensor output signal, based on the ToF signal and an activation signal that activates the integrator, to produce an integrator output signal.

9. The autonomous driving vehicle of claim 8, wherein the first photodetector is an avalanche photodiode (APD) and the second photodetector is a single-photon avalanche diode (SPAD).

10. The autonomous driving vehicle of claim 8, wherein the second circuitry portion comprises:
a time to digital converter (TDC) to generate the ToF signal based on the second optical sensor output signal and a light emitter trigger signal.

11. The autonomous driving vehicle of claim 10, wherein the first circuitry portion further comprises:
an analog to digital converter (ADC) to sample the integrator output signal at a sampling rate to produce the intensity signal.

12. The autonomous driving vehicle of claim 11, wherein the LIDAR device further comprises a logic block to generate the light emitter trigger signal that triggers the light emitter to emit the light beam, and the activation signal that activates the integrator.

13. The autonomous driving vehicle of claim 11, wherein an amplitude of the intensity signal is directly proportional to the intensity of the received portion of the light beam.

14. The autonomous driving vehicle of claim 8, wherein a distance between the LIDAR device and the target is determined based on the ToF of the emitted light beam.

15. A method for operating a LIDAR device of an autonomous driving vehicle, the method comprising:
emitting, using a light emitter, a light beam to sense a physical range of a target;
receiving, using an optical sensing unit, at least a portion of the light beam reflected from the target;
generating, by the optical sensing unit, a first optical sensor output signal and a second optical sensor output signal responsive to the received portion of the light beam;
based on the first optical sensor output signal, producing an intensity signal indicative of an intensity of the received portion of the light beam; and
based on the second optical sensor output signal, producing a time of flight (ToF) signal indicative of a ToF of the emitted light beam;
wherein producing the intensity signal comprises performing integration on the first optical sensor output signal, based on the ToF signal and an activation signal that activates the integration, to produce an integrator output signal.

16. The method of claim 15, wherein the optical sensing unit includes a first photodetector and a second photodetector, the first photodetector being a different type of photodetector from the second photodetector.

17. The method of claim 16, wherein the first optical sensor output signal is generated by the first photodetector, and the second optical sensor output signal is generated by the second photodetector.

18. The method of claim 17, wherein the first photodetector is an avalanche photodiode (APD) and the second photodetector is a single-photon avalanche diode (SPAD).

19. The method of claim 15, further comprising generating a light emitter trigger signal to trigger the emitted light beam.

20. The method of claim 19, wherein producing the time of flight (ToF) signal is further based on the light emitter trigger signal.

21. The method of claim 20, wherein producing the intensity signal further comprises:
sampling the integrator output signal at a sampling rate to produce the intensity signal.

22. The method of claim 15, wherein an amplitude of the intensity signal is directly proportional to the intensity of the received portion of the light beam.

23. The method of claim 15, wherein the physical range of the target is determined based on the ToF of the emitted light beam.

* * * * *